Dec. 23, 1969  G. REITER  3,485,353
DAPPEN-DISH CONSTRUCTION
Filed Jan. 31, 1968
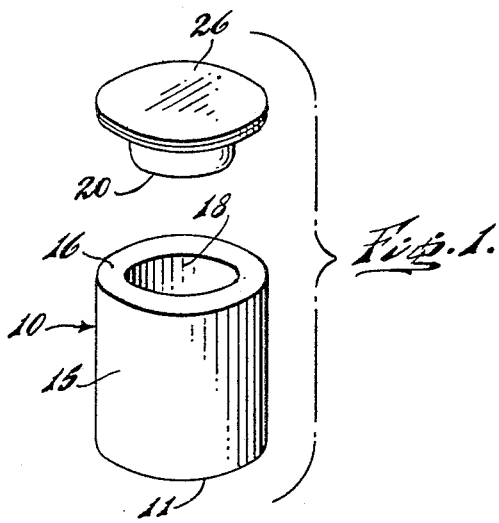
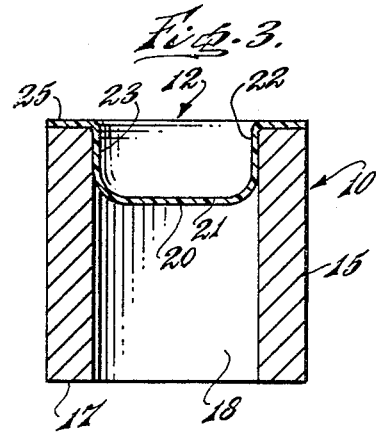
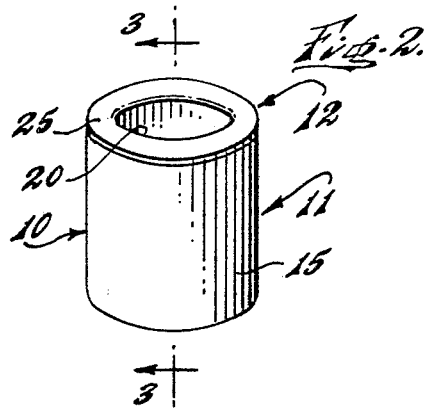
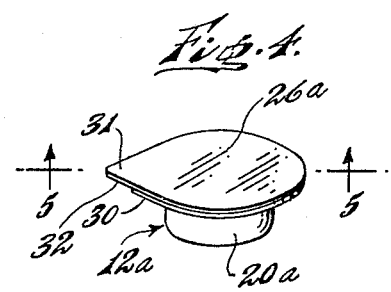
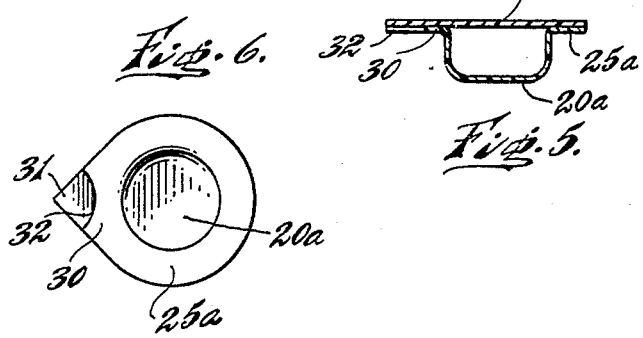
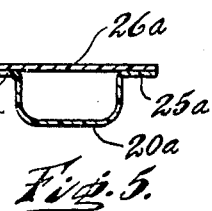
INVENTOR.
Gabriel Reiter
BY Robert K. Youtie
ATTORNEY

United States Patent Office 3,485,353
Patented Dec. 23, 1969

3,485,353
DAPPEN-DISH CONSTRUCTION
Gabriel Reiter, 8204 Ventnor Ave.,
Margate City, N.J. 08402
Filed Jan. 31, 1968, Ser. No. 702,003
Int. Cl. A61b *19/02*
U.S. Cl. 206—63.5                     3 Claims

ABSTRACT OF THE DISCLOSURE

This invention is essentially concerned with a dappen dish for dental use and the like wherein a generally cylindrical base of substantial weight is provided in its upper side with a hole, and a deformable receptacle is conformably engaged in the hole, having a peripheral flange outstanding from the receptacle in overlying relation with the base.

BACKGROUND OF THE INVENTION

In the dental field there are many operations and procedures involving the manual mixing and spatulation of small quantities of materials. This was heretofore accomplished in glass cups or on glass slabs or oiled paper, or the like, lacking safeguards against contamination and being very wasteful of the products, as well as being difficult and inconvenient to perform in a neat and sanitary manner.

SUMMARY

Accordingly, it is an object of the present invention to provide a dappen dish or the like for dental use which is adapted to maintain the sterility of the contents during mixing and spatulating procedures, and which is extremely convenient for use by an operator during these procedures, the dappen dish being capable of stable positioning on a support or being hand held.

It is another object of the present invention to provide a dappen dish having the advantageous characteristics of the foregoing paragraph, which includes a relatively inexpensive disposable receptacle part, and a reusable receiver or base, so as to effect substantial economics in product manufacture and use, as well as convenience in the performance of numerous dental operations, such as the use of cleaning powders and pastes, and the mixing of cements, filling material, medications, and the like.

Other objects of the present invention will become apparent upon reading the following specification and referring to the accompanying drawing, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWING

FIGURE 1 is an exploded perspective view showing a dappen-dish construction in accordance with the teachings of the present invention prior to use.

FIGURE 2 is a top perspective view showing the dappen dish of FIGURE 1 in an operative condition of use.

FIGURE 3 is a sectional elevational view taken generally along the line 3—3 of FIGURE 2.

FIGURE 4 is a top perspective view showing a slightly modified form of dappen-dish component of the present invention.

FIGURE 5 is a longitudinal sectional elevational view taken generally along the line 5—5 of FIGURE 4.

FIGURE 6 is a bottom view of the component of FIGURE 4.

DESCRIPTION OF THE PREFERRED EMBODIMENTS

Referring now more particularly to the drawing, and specifically to FIGURES 1–3 thereof, a dappen-dish construction is generally designated 10, and includes a base part or receiver 11, and a dish part or receptacle 12.

The base 11 may be formed of a cylindrical or tubular part having a generally cylindrical outer side wall or surface 15, and generally annular upper and lower sides or end surfaces 16 and 17.

Centrally or axially of the base 11, there is formed a hole or passageway 18 which extends longitudinally through and open from opposite ends of the base. That is, the hole 18 opens upwardly and downwardly through the upper and lower sides 16 and 17 of the base, being of substantially constant circular cross section throughout its extent.

The base 11 is advantageously fabricated of metal, such as stainless steel, and the proportions are such that the base is highly stable in an upstanding position resting with its lower end 17 on a horizontal support.

The receptacle 12 may advantageously be integrally fabricated of deformable plastic material, such as thermoplastic sheet material formed by thermoforming, and may include a dished receptacle part 20 configured for snug insertion downwardly into the upper open end of hole 18, so as to open upwardly therefrom. More particularly, the receptacle 20 may include a generally flat substantially circular bottom wall 21, and upstanding therefrom a generally cylindrical peripherally extending side wall 22, which is connected at its lower end by a smoothly curved annular corner portion 23 extending between and merging into the bottom and side walls.

Extending peripherally about the rim or upper open end of the receptacle 20, extending radially outward therefrom, is a generally coplanar flange 25. The flange is advantageously of an annular configuration, having a radial extent substantially equal to the radial extent of base top surface 16, so as to substantially completely overlie and seat on the upper base side 16. Thus, the side wall 22 of the receptacle part 20 is snugly engageable in the base hole 18, while the flange 25 rests conformably on the upper base side 16, substantially completely covering the latter.

In this condition, it will be appreciated that the receptacle 12 is effectively held secure in the base 11 with the dished central receptacle-part-proper 20 being conveniently accessible to mixing and spatulation, either with the base stably seated on a support, or held in the user's hand. Also, the integral formation of receptacle bottom wall 20, side wall 22 and flange 25 facilitates complete mixing and ease of spatulation by the absence of corners, while insuring effective sterility and preventing contamination by isolating the material being worked from the base 11.

The receptacle 12 may be very economically formed by the above-described thermoforming procedure, so that its disposal is economically justified after a single use.

Further, the receptacle 12 may include a generally circular cover sheet 26, say of a flexible plastic, or the like, extending completely across and in closing relation with the dished receptacle part, and in adhesively secured facing relation with respect to the flange 25. In this form, the closed receptacle 12 may provide a convenient shipping and storage container for dental products whose sterility must be assured. The cover sheet 26 is advantageously substantially congruent with the external configuration of the flange 25, and is preferably adhesively secured to the flange over the entire upper surface of the latter. This insures both an effective seal against contamination, and further insures that the upper flange surface remain uncontaminated in storage and shipment to prevent contamination of the contents in use. Any suitable strippable adhesive means may be interposed between the closure sheet 26 and flange 25, preferably permitting of a stripping action to remove the closure sheet and afford convenient access to the receptacle contents while maintaining the desired sterility.

Also, snug insertion of the receptacle 12 in the base 11 may afford a convenient means of supporting the receptacle during stripping action of the closure sheet 26.

After use, the receptacle 12 may be readily removed from the base 11, as by manual withdrawing therefrom against the frictional holding force, and the receptacle may be replaced with a different receptacle.

While a relatively shallow receptacle is illustrated in the drawing, which would be admirably well suited for mixing dental prophylaxis paste, it is understood that the thru hole 18 permits of employing receptacles of widely differing depths, as may be required for different contents involving different operations.

A slightly modified embodiment of receptacle is shown in FIGURE 4, there being generally designated 12a, including a dished portion or receptacle proper 20a, and a peripheral outstanding flange 25a. The receptacle 12a may be substantially identical to the receptacle 12 in all respects, except that the flange 25a is provided with a radial extension or outstanding tab 30, integral with the flange and arcuately notched or cut away, as at 32. The cover sheet 26a may be essentially similar to the cover sheet 26, and is provided with a radial extension or tab portion 31 overlying and in facing relation with the flange tab portion 30 and extending therebeyond to define a finger pull. By this construction of the tab portions 30 and 31, the latter may be employed as a finger pull to facilitate stripping action or removal of the cover sheet 26a from the flange 25a.

From the foregoing, it is seen that the present invention provides a dappen-dish construction for dental use, and the like, which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention.

What is claimed is:

1. A dappen-dish or the like for dental use, comprising a generally cylindrical heavy walled metal base of substantial weight adapted to rest in upstanding relation on a supporting surface and be conveniently handheld, said base having in its upper side a centrally located upwardly opening hole, an open receptacle of deformable plastic material removably snugly inserted in upwardly opening relation in said hole, said receptacle being self-sustaining in form on removal from said base and filled with contents, an external flange integral with and extending peripherally about said receptacle substantially completely overlying and seated on the upper side of said base to prevent contamination of said contents, said receptacle being firmly retained and weighted in position by said base for stirring contents in said receptacle and being removable from said base for reuse of the latter with another receptacle, and a flexible closure sheet extending in closing relation across said receptacle and removably adhesively secured in facing relation with said flange.

2. A dappen dish according to claim 1, said hole extending completely through said base, for accommodating receptacles of different depths.

3. A dappen dish according to claim 1, said receptacle including generally flat bottom wall, and a generally cylindrical peripheral side wall upstanding from said bottom wall and smoothly merging therewith, to facilitate the mixing of contents in said receptacle.

References Cited

UNITED STATES PATENTS

| 386,750 | 7/1888 | Kimball | 32—39 |
|---|---|---|---|
| 3,054,679 | 9/1962 | Bradford. | |
| 3,355,080 | 11/1967 | Rausing et al. | 229—14 |
| 3,381,814 | 5/1968 | Benfield | 206—63.5 |
| 2,264,827 | 12/1941 | Christensen | 220—23 X |

FOREIGN PATENTS

| 613,023 | 1/1961 | Canada. |
|---|---|---|
| 97,974 | 2/1923 | Switzerland. |

MARTHA L. RICE, Primary Examiner

U.S. Cl. X.R.

32—39; 220—23, 69